(12) United States Patent
Krech et al.

(10) Patent No.: US 9,045,829 B2
(45) Date of Patent: Jun. 2, 2015

(54) PROCESS FOR PRODUCING A COATED METAL STRIP

(75) Inventors: Dieter Krech, Hagen (DE); Gerald Zwickel, Biedenkopf (DE); Stefan Sepeur, Wadgassen (DE); Stefan Geodicke, Neunkirchen (DE)

(73) Assignees: Bilstein GmbH & Co. KG, Hagen (DE); Nano-X GmbH, Saarbruecken (DE)

( * ) Notice: Subject to any disclaimer, the term of this patent is extended or adjusted under 35 U.S.C. 154(b) by 199 days.

(21) Appl. No.: 13/579,340

(22) PCT Filed: Mar. 15, 2011

(86) PCT No.: PCT/EP2011/001270
§ 371 (c)(1),
(2), (4) Date: Aug. 16, 2012

(87) PCT Pub. No.: WO2011/113575
PCT Pub. Date: Sep. 22, 2011

(65) Prior Publication Data
US 2013/0000372 A1    Jan. 3, 2013

(30) Foreign Application Priority Data

Mar. 17, 2010  (DE) .................. 10 2010 011 754

(51) Int. Cl.
| | | |
|---|---|---|
| B21B 45/00 | (2006.01) | |
| B05D 7/14 | (2006.01) | |
| B32B 15/01 | (2006.01) | |
| B32B 15/16 | (2006.01) | |
| C23C 26/00 | (2006.01) | |
| C09D 5/08 | (2006.01) | |
| C23C 22/74 | (2006.01) | |
| B05D 3/02 | (2006.01) | |

(52) U.S. Cl.
CPC .............. *C23C 26/00* (2013.01); *B05D 3/0254* (2013.01); *B05D 2202/00* (2013.01); *B05D 2252/02* (2013.01); *B05D 2601/28* (2013.01); *C09D 5/084* (2013.01); *C23C 22/74* (2013.01)

(58) Field of Classification Search
CPC ...... B21B 45/004; B21B 45/00; B05D 3/102; B05D 7/14; B32B 15/01; B32B 15/16
USPC ........................... 427/178; 72/47, 46; 428/457
See application file for complete search history.

(56) References Cited

U.S. PATENT DOCUMENTS

| | | | | |
|---|---|---|---|---|
| 5,182,171 | A  * | 1/1993 | Aoyama et al. | 428/623 |
| 6,440,580 | B1 * | 8/2002 | Berger et al. | 428/623 |
| 6,777,034 | B2 * | 8/2004 | Berger et al. | 427/410 |
| 8,936,836 | B2 * | 1/2015 | Domes et al. | 427/388.4 |
| 2004/0022950 | A1 | 2/2004 | Jung et al. | |
| 2004/0062873 | A1 * | 4/2004 | Jung et al. | 427/407.1 |
| 2005/0037212 | A1 * | 2/2005 | Budinski | 428/457 |
| 2007/0237978 | A1 | 10/2007 | Schubert | |
| 2007/0238257 | A1 | 10/2007 | Paar et al. | |
| 2008/0032150 | A1 * | 2/2008 | Blejde et al. | 428/544 |
| 2008/0057345 | A1 * | 3/2008 | Emmonds et al. | 428/702 |
| 2009/0068480 | A1 * | 3/2009 | Koch et al. | 428/457 |
| 2009/0186230 | A1 * | 7/2009 | Sun et al. | 428/457 |
| 2009/0325073 | A1 * | 12/2009 | Okano et al. | 429/221 |
| 2010/0098956 | A1 * | 4/2010 | Sepeur et al. | 428/457 |
| 2012/0009340 | A1 | 1/2012 | Sepeur et al. | |

FOREIGN PATENT DOCUMENTS

| | | | |
|---|---|---|---|
| DE | 1 621 947 | A1 | 6/1971 |
| DE | 10 2004 049 413 | A1 | 4/2006 |
| DE | 10 2007 038 214 | A1 | 2/2009 |
| DE | 10 2008 020 216 | A1 | 10/2009 |
| DE | 10 2008 051 883 | A1 | 4/2010 |
| EP | 1 837 091 | A1 | 9/2007 |
| GB | 1199043 | A | 7/1970 |
| WO | 02/31063 | A1 | 4/2002 |
| WO | 2009021490 | A2 | 2/2009 |
| WO | 2009129783 | A2 | 10/2009 |
| WO | 2010043220 | A1 | 4/2010 |
| WO | WO 2010043220 | A1 * | 4/2010 |

OTHER PUBLICATIONS

English Translation of WO2009/021490, Feb. 19, 2009.*

* cited by examiner

*Primary Examiner* — Douglas McGinty
(74) *Attorney, Agent, or Firm* — Laurence A. Greenberg; Werner H. Stemer; Ralph E. Locher

(57) ABSTRACT

A process produces a coated metal strip from a semi-finished strip, in which the semi-finished strip is reeled off a coil. A corrosion protection layer is then applied to the semi-finished strip and the coated semi-finished strip is then reeled up to form a coil. The semi-finished strip is a cold-rolled strip obtained by cold rolling, cooling and recrystallization annealing. A medium containing metallic particles is applied to form the corrosion protection layer. The medium is a wet-chemical solution which is applied by spraying, dipping, squirting, flooding or rolling. The corrosion protection layer is dried on the cold-rolled strip by supplying heat at a temperature below the recrystallization annealing temperature of the cold-rolled strip after application of the medium and before reeling-up.

24 Claims, 2 Drawing Sheets

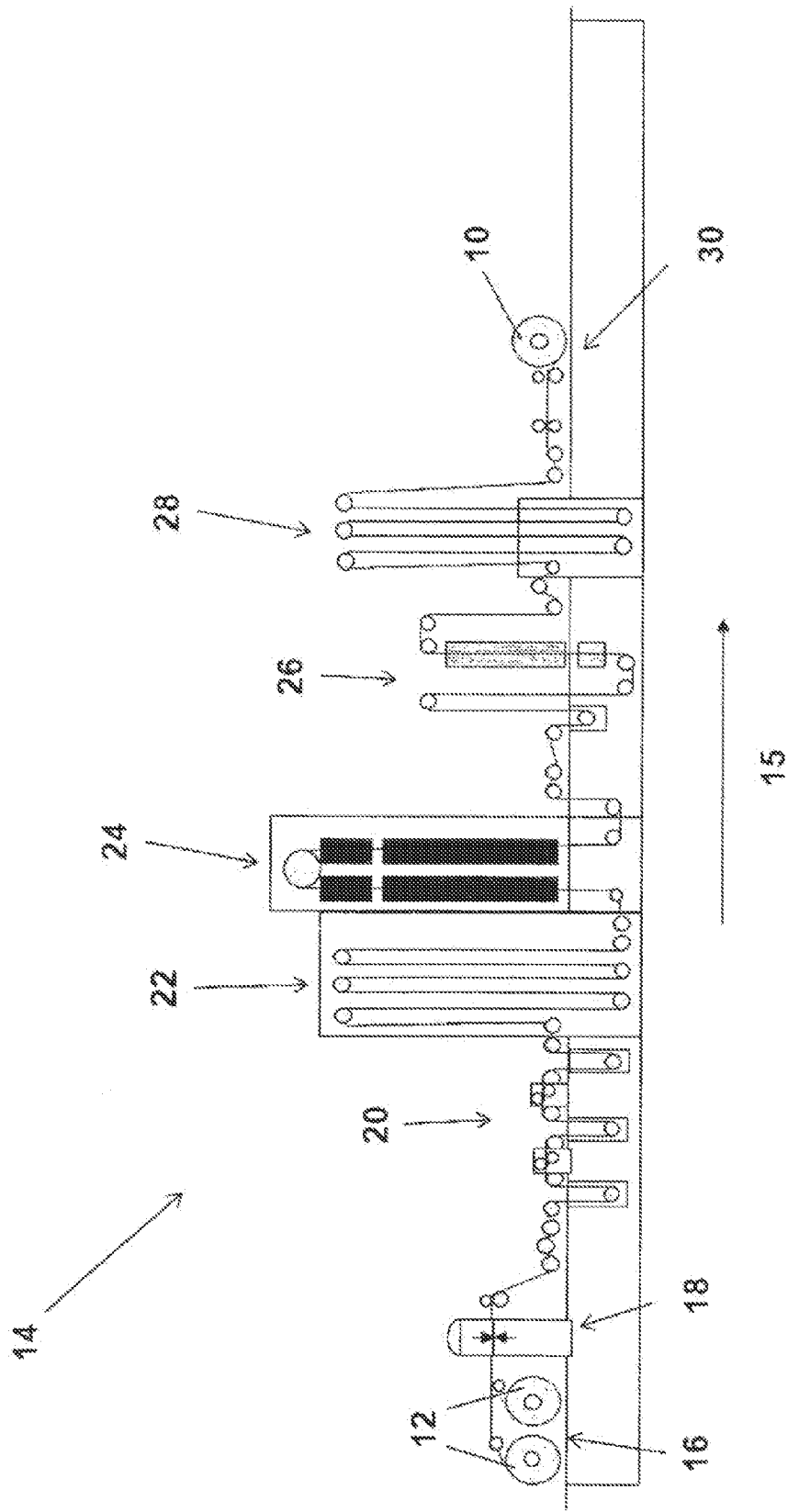

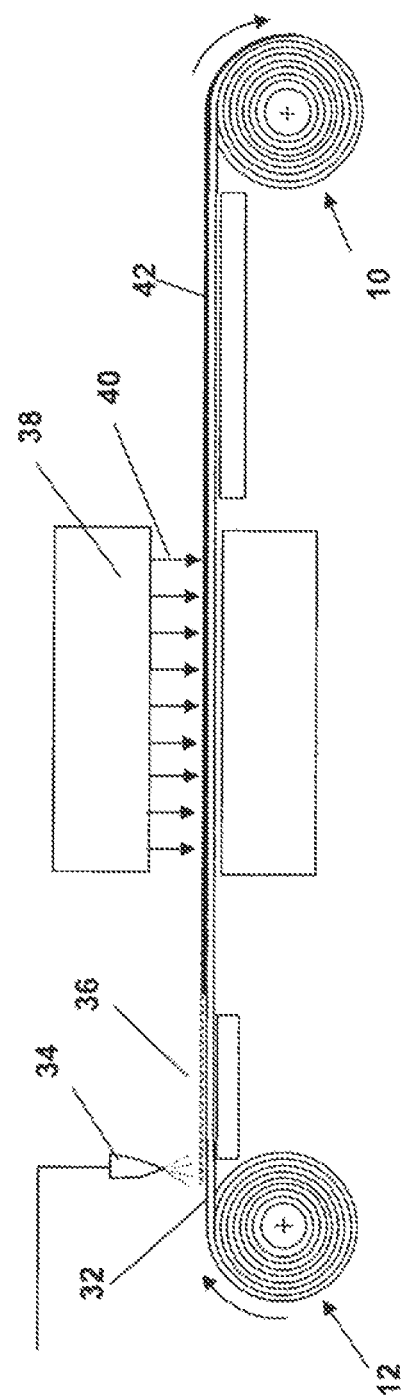

PROCESS FOR PRODUCING A COATED METAL STRIP

BACKGROUND OF THE INVENTION

Field of the Invention

The invention relates to a process for producing a coated metal strip having the features of claim 1.

The necessity for continual process, property and cost optimization in steel products, for example for vehicle construction, has led to comprehensive development of innovative surface upgradings for unalloyed, in particular shaped, flat steel products. Here, an important focus of development is in corrosion protection, with aspects of increasing environmental friendliness and sparing use of resources for the surface coatings to be applied also becoming increasingly important. Melt dipping processes, electrolytic electrochemical depositions or organic coating processes are becoming widely used for the production of such, in particular metallic or organic, surface coatings.

Apart from corrosion resistance, good adhesion, scratch resistance and wear resistance are also required, in particular, for subsequent molding processes. In addition, the decorative appearance of the product, for example targeted coloring of the surfaces, is also a factor in many applications.

Widespread use examples are at least partly visible interior components of an automobile body, e.g. sides of seats, parts of seat rests, seat rails, safety belt height adjusters or housing angles for a safety belt. As a specific example of the production and shaping of a seat rail, a high-strength flat steel product, preferably a cold-rolled strip, is used and is shaped by means of a multistage shaping process such as stamping, bending or profiling to produce a seat rail. The component obtained is provided with a coating in a subsequent treatment for the purpose of corrosion protection and also for decorative or visual reasons. Coating is typically carried out by means of cathodic dip coating (CDC) with the individual process steps degreasing, rinsing, phosphating, rinsing and drying. A disadvantageous consequence of this procedure is that an additional process is necessary.

It is also already known that strip steel can be provided with nonmetallic coatings, in particular for the purpose of corrosion protection, specifically to apply a surface coating or to coat with plastic, during semifinished part production or a process which is part of semifinished part production. In the document DE 1 621 947, it is stated that the coating material is applied with a liquid consistency to the strip steel rolled off from a coil and the coating present on the rolled material is subsequently dried during the annealing treatment required after rolling and is optionally baked. The temperature for the annealing treatment is in the range from about 350 to 650 degrees Celsius, with the specific choice of the annealing temperature taking into account the temperature which the coating material will withstand. The strip steel which has been coated in this way is subsequently rolled up again to form a coil.

The procedure described in this document DE 1 621 947 subjects the coating to be applied to a temperature which is significantly higher than in conventional processing, so that this process is not suitable for substances which are adversely affected by, for example decomposed or converted into an undesirable state, by these temperatures.

Furthermore, it is known from WO 2010/043220 A1, which is not a prior publication, that a metallic surface can be coated with a deformable corrosion protection layer containing metallic magnesium, zinc, aluminum or titanium particles which are admixed with at least one metal compound, where surface-modified metal particles are formed as a result of a reaction between the metal particles and the metal compound and are strengthened at a temperature up to 500° C. The document gives no pointer to applying the corrosion protection layer as an aqueous solution to a high-strength cold-rolled strip obtained by cold rolling and recrystallization annealing and has been rolled off from a coil before application of the corrosion protection layer and is rolled up again to form a coil after application and drying of the corrosion protection layer.

BRIEF SUMMARY OF THE INVENTION

It is an object of the present invention to apply a deformable metallic corrosion protection layer to a high-strength cold-rolled strip which has been obtained by cold rolling, cooling and recrystallization annealing and can subsequently be molded into a desired three-dimensional shape together with the applied corrosion protection layer at high degrees of deformation without loss of strength.

This object is achieved according to the invention by a process for producing a coated metal strip having the features according to the claims. Advantageous embodiments of the invention are defined in the dependant claims.

According to the invention, a process for producing a coated metal strip from a semifinished strip in which the semifinished strip is wound off from a coil, a corrosion protection layer is then applied to the semifinished strip and the coated semifinished strip is then wound up to form a coil is characterized in that the semifinished strip (12) is a cold-rolled strip which is obtained by cold rolling, cooling and recrystallization annealing and to which a medium having metallic particles has been applied to form the corrosion protection layer. The medium is a wet-chemical solution which is applied by spraying, dipping, squirting, flooding or rolling. The corrosion protection layer is dried on the cold-rolled strip by supply of heat at a temperature which is below the recrystallization annealing temperature of the cold-rolled strip after application of the medium and before rolling up.

The coil can also be referred to as a roll. The particles can, in particular, have a size of less than 1 mm, preferably less than 1 μm. The coating can, in particular, be on one side or partial. In the application of the medium, the medium is, in particular, fluid, preferably liquid. The applied medium is dried and forms a firmly adhering and ductile layer, in particular before the coated semifinished strip is rolled up again. The corrosion protection is, in particular, cathodic corrosion protection and/or active corrosion protection. In this way, additional, batchwise process steps such as, in particular, after-working, are saved compared to the conventional procedure, and the same or even improved corrosion protection is achieved at the same time. Costly and energy-consuming off-line processes, for example upgrading by melt dipping or an energy-intensive electrolysis with the associated expensive disposal of chemical wastes which are possibly toxic to human beings and the environment (e.g. electrolysis baths, molten zinc baths, rinsing water, after-treatment liquids), can be replaced. The energy input is reduced and a more favorable energy balance is achieved. After cutting into lengths, the coated metal strip obtained according to the invention can be brought to the customer who can, in particular, carry out three-dimensional molding in which the coating remains undamaged.

For constant requirements in terms of corrosion protection, significant reductions of up to 80% in the layer thicknesses and thus significantly improved properties for further processing, e.g. suitability for welding, soldering compatibility and adhesive bonding compatibility, are obtained. The usage of material for corrosion protection is reduced by up to 80% and lower costs and weight structures are therefore achieved for the components produced from the coated metal strip.

The material of the semifinished strip or cold-rolled strip is preferably a high-strength steel, for example a manganese-boron steel.

The medium is a wet-chemical solution, in particular an aqueous or organic solution. The metallic particles can be present in suspension, gelled or dispersed in the wet-chemical solution. Apart from the metallic particles, the medium can also comprise color pigments, in particular nanopigments, so that not only corrosion protection but also decorative and/or functional coloring or coloration of the semifinished strip is effected.

In the process of the invention, application can be effected by spraying, dipping, squirting, flooding or rolling. Spraying is particularly preferred as application method since precise supply, in particular in a controlled or regulated amount, can be carried out. Fine finishing is possible.

In the process of the invention, the applied coating, viz. the corrosion protection layer, is dried, in particular by supply of heat, after application and before rolling-up on the semifinished strip. Typically, only a few seconds are required for this. The temperature here is below the annealing and recrystallization annealing temperatures necessary for steel. Thus, a temperature-related influence on property changes in the case of high-strength, multiphase transformable steel materials is advantageously avoided. Although the temperature can also be below 350° C., it is preferably less than 300° C. and particularly preferably less than 250° C. However, the temperature is preferably greater than 150° C. in order to shorten the time required for drying of the aqueous or organic solution.

Furthermore, the surface of the semifinished strip to be coated can optionally be cleaned after winding-off and before application of the medium in the process of the invention. In particular, cleaning can be mechanical and/or comprise degreasing or deoiling. Cleaning is preferably carried out continuously.

In the process of the invention, coating and in particular winding-off and rolling-up can advantageously be carried out continuously and/or with ongoing movement of the strip, so that an interruption-free or continuous manufacturing process (in-line process) is achieved. Furthermore, the step of application can advantageously be integrated as additional manufacturing module into existing process lines without changing them otherwise, so that significantly lower capital costs are incurred for process expansion when, for example, no additional oven is required.

There are no a priori materials restrictions for the metallic particles. The metal used for the metallic particles can, in particular, be low-melting. In specific applications, the metallic particles to be applied in the process of the invention can also be, in particular, metallic nanoparticles, tin, zinc, aluminum, manganese, chromium, nickel, iron, lead, magnesium, calcium, strontium, barium, sodium, potassium, lithium, bismuth, indium, cerium, tellurium, zirconium, silver, titanium or copper in a mixture and/or alloy or as pure material. The specific chemical composition of the metallic coating can be chosen or configured freely, in particular with a view to the desired use. This results in a considerable increase in the efficiency of corrosion protection. Examples of mixed structures or alloys are zinc and aluminum, zinc and manganese, zinc and titanium, brass, bronze.

In a preferred embodiment of the process of the invention, the metallic particles comprise a mixture of aluminum and zinc or of aluminum and magnesium or of aluminum, zinc and magnesium.

In terms of corrosion protection and adhesion and also the moldability of the coated cold-rolled strip, it has been found to be particularly advantageous for the proportion of aluminum in the corrosion protection layer to be in the range from 1 to 40% by weight, preferably from 5 to 20% by weight, the proportion of zinc to be in the range from 0 to 90% by weight, preferably from 50 to 80% by weight, and the proportion of magnesium to be in the range from 0 to 90% by weight, preferably from 50 to 80% by weight, in each case based on the total weight of the dried corrosion protection layer.

According to a further idea underlying the invention, the metallic particles in the corrosion protection layer are present in a matrix of titanium dioxide and/or of organic compounds, in particular polyurethanes, polyesters, epoxy resins, alkyd resins, phenolic resins, melamine resins, acrylates, methacrylates, organic-inorganic compounds, in particular oligosiloxanes and polysiloxanes from hydrolysis and condensation of alkylalkoxysilanes or alkoxysilanes or mixtures thereof or silicones or silicone resins or organically modified silicone resins, or purely inorganic compounds, in particular silicates, polyphosphates, aluminosilicates or metal oxides. These produce the bond between the metallic particles and the surface of the cold-rolled strip in the corrosion protection layer after drying. It is likewise conceivable for the metallic particles in the corrosion protection layer to be taken up in a matrix of oxidic nanoparticles of metals or semimetals in order to bond these to the surface of the cold-rolled strip.

With regard to a good bonding effect, it has been found to be particularly advantageous for the corrosion protection layer to contain titanium butoxide and/or zirconium oxides. However, it is likewise conceivable to provide the bond between the metal particles and the surface of the cold-rolled strip by means of indium-tin oxide (ITO), antimony-doped tin dioxide (ATO), fluoride-doped tin dioxide (FTC)) or other conductive or semiconducting oxides present in the corrosion protection layer.

In a preferred embodiment of the invention, the cold-rolled strip has a structured surface, in particular a surface obtained by rolling, which has an average surface roughness Ra of from 0.9 to 1.5 microns. The surface structure is preferably produced by the cold-rolled strip being passed through at least one gap between rollers having a structured surface before application of the corrosion protection layer. To achieve good adhesion of the intermediate layer in conjunction with good moldability of the cold-rolled strip, it is particularly advantageous in this context for the rollers to be provided with a structured surface by chromium-plating by the PRETEX® process since such a surface does not produce a direction-dependent visual appearance in the component to be produced after the molding process.

The metallic particles can, for example, have a spherical shape, with the average diameter of the metallic particles being in the region of the average surface roughness Ra of the surface of the cold-rolled strip. This advantageously increases the bonding effect between the metallic particles and the surface of the cold-rolled strip.

According to a further idea underlying the invention, the metallic particles have a flattened, platelet-like shape and the diameter of the metallic particles is greater, in particular from 1.5 to 10 times greater, than the average surface roughness Ra of the surface of the cold-rolled strip. This results in the advantage that the metallic particles which in this case are preferably present as flakes in the wet-chemical solution of the medium become superposed in a plurality of layers after application of the solution and after drying of a very thin corrosion protection layer having a plurality of particle layers which adheres very well to the surface of the cold-rolled strip and at the same time ensures a surprisingly good moldability.

The flattened platelet-like metallic particles have a thickness of less than 1 micron, preferably less than 0.5 micron, and have an average diameter in the range from 5 to 20 microns, preferably from 10 to 15 microns. Particularly good adhesion combined with significantly improved moldability of the coated cold-rolled strip in the case of highest qualities of the cold-rolled strip can here be observed in the case of the roughnesses Ra, diameters and thicknesses of the flakes mentioned above as preferred at layer thicknesses of the dried medium on the cold-rolled strip which are in the range from 1 micron to 10 microns, preferably from 3 microns to 5 microns.

The process of the invention can also be applied to semifinished strips which have already been coated, either to apply a further layer or partially to carry out a repair to the existing coating.

In conjunction with the process of the invention, the invention also provides the coated metal strip which can be obtained, in particular has been obtained, by a process having the individual features, combinations of features or all features according to the present description. The coated metal strip of the invention comprises a metallic cold-rolled strip and a corrosion protection layer containing metallic particles which has been applied thereto in the above-described manner.

The metal strip which has been coated according to the invention can be used, for example, for making parts of vehicles, in particular motor vehicles (for example body parts or engine parts), parts for trains or aircraft, for water vehicles, for example ships, for parts of machines, for parts of industrial plants, for parts of agricultural appliances or metal parts used in building and construction or in mining.

Further advantages and advantageous embodiments and further developments of the invention are described below with reference to the figures.

In the figures:

BRIEF DESCRIPTION OF THE SEVERAL VIEWS OF THE DRAWING

FIG. 1 shows an embodiment of a manufacturing plant for carrying out the process of the invention and FIG. 2 schematically shows a detail of the process of the invention.

DESCRIPTION OF THE INVENTION

FIG. 1 shows an embodiment of a manufacturing plant 14 which is suitable for carrying out the process of the invention for producing a coated metal strip 10. The direction of movement 15 of the strip in the manufacturing plant 14 shown is indicated by the arrow. A semifinished strip in the form of a cold-rolled strip 12 which has been rolled up to form a coil is wound off from at least one supply reel 16. In this embodiment of the manufacturing plant 14, there are two supply reels 16 so that the wound-off semifinished strips 12 can be welded together in a strip welding machine 18 in order to make continuous operation of the manufacturing plant 14 possible.

The wound-off semifinished strip 12, which has previously been cold rolled and strengthened thereby, is firstly subjected to strip cleaning 20 in a plurality of stages, so that, in particular, organic soiling is removed from the surface to be coated in the further course of the process. Before the actual processing sections of the manufacturing plant 14, the semifinished strip 12 is firstly taken up in an input strip storage 22. From this it goes into a continuous strip furnace 24 having a cooling section, in which the cold-strengthened steel strip 12 is annealed and then cooled. Coating according to the invention takes place in the strip coating section 26 with reactor (for details, see also FIG. 2). The cold-rolled strip which has been provided with the corrosion protection layer is then taken up in an output strip storage 28 and finally goes to a rolling-up group 30 which comprises cropping shears so that individual coils of coated cold-rolled strip 10 can be manufactured.

FIG. 2 schematically shows a detail of the process of the invention for the example of a cold-rolled strip which has previously been separately cold-rolled at least once, recrystallization annealed and subsequently cooled. The cold-rolled strip 12 is wound off from a coil. Its surface 32 passes a spray device 34 from which a liquid medium 36 is applied in a metered manner as wet-chemical solution with metallic particles present therein to the surface 32. The liquid medium 36 forms a layer which solidifies. Drying is aided and/or accelerated by energy in the form of heat radiation and/or hot air being supplied by means of a dryer 38 to the surface 32 (energy supply 40). In this way, a corrosion protection layer 42 containing metallic particles is formed on the surface 32 of the cold-rolled strip 12. The coated cold-rolled strip 12 is subsequently rolled up again to form a coil and passed to a molding apparatus (not shown) in which the coated cold-rolled strip is, for example, converted into a component having a desired three-dimensional shape by deep drawing.

In specific embodiments, the medium containing metallic particles which is to be applied according to the invention can have various compositions. In a first example, the medium comprises hydrolyzates and/or condensates of at least one silane or a silicone resin binder. In addition, the medium can contain an organic solvent, e.g. commercial alcohols, esters, ethers or hydrocarbons, in particular petroleum spirits, in this first example. Furthermore, it is possible to add a solid lubricant, for example wax, stearate, graphite, carbon black, molybdenum disulfide, tungsten disulfide, boron nitride, aluminum oxide, titanium oxide or mica. In a second example, the medium can contain an organic compound as binder, in particular a polyurethane, a polyester, an epoxy resin, an alkyd resin, a phenolic resin, a melamine resin, an acrylate, a methacrylate, an oligosiloxane or a polysiloxane or mixtures of silicones or silicone resins. As an alternative, purely inorganic compounds can also function as binder in the second example, for example polyphosphates, aluminum silicates, metals, metal alkoxides, metal oxides and metal salts. Furthermore, it is possible for a lubricant to be present, for example one of the solid lubricants mentioned above for the first example but also natural or synthetic waxes, oils, polytetrafluoroethylene, fluoroethylene-propylene, thermoplastic polymers such as polyethylene, polyamide, stearate, aluminum soaps, zinc soaps, magnesium soaps or lithium soaps, higher fatty acids, organic compounds of chlorine, phosphorus and sulfur, fluorides of calcium or barium, phosphates, oxides, hydroxides and sulfides of calcium and zinc and also metals such as lead, copper, tin, silver, gold, indium and nickel. In the second example, the medium can also comprise one or more corrosion protection pigments or corrosion inhibitors, in particular silicates, polyphosphates, tannin derivatives, basic sulfonates of alkali metals or alkaline earth metals, zinc salts, organic nitrogen acids, phosphates, chromates, molybdates of calcium, magnesium, zinc or aluminum. The substances mentioned by way of example for particular components of the two examples described can also be combined to give further examples.

LIST OF REFERENCE NUMERALS 10 coated metal strip/cold-rolled strip
12 semifinished strip
14 manufacturing plant
15 direction of movement of the strip
16 supply reel
18 strip welding machine
20 strip cleaning
22 input strip storage
24 continuous strip furnace
26 strip coating with reactor
28 output strip storage
30 rolling-up group with cropping shears
32 surface of the strip
34 spray device
36 medium containing metallic nanoparticles
38 dryer
40 energy supply
42 corrosion protection layer

The invention claimed is:

1. A process for producing a coated metal strip from a semi-finished strip, which comprises the steps of:
    providing a coil of a cold-rolled strip obtained by cold rolling, cooling and recrystallization annealing;
    unwinding the cold-rolled strip off of the coil;
    applying a medium having metallic particles to the cold-rolled strip for forming a corrosion protection layer resulting in a coated semi-finished strip, the medium being a wet-chemical solution applied by one of spraying, dipping, squirting, flooding or rolling;
    drying the corrosion protection layer on the cold-rolled strip by supplying heat at a temperature being below a recrystallization annealing temperature of the cold-rolled strip after application of the medium and before performing a winding up step; and
    performing the winding up of the coated semi-finished strip to form a further coil.

2. The process according to claim 1, which further comprises setting the temperature during the drying to be below 350 degrees Celsius.

3. The process according to claim 1, which further comprises cleaning a surface of the cold-rolled strip to be coated after winding-off and before application of the medium.

4. The process according to claim 1, which further comprises carrying out the applying of the medium at least one of continuously or with ongoing movement of the cold-rolled strip.

5. The process according to claim 1, which further comprises selecting the metallic particles from the group consisting of tin, zinc, aluminum, chromium, nickel, lead, iron, magnesium, calcium, strontium, barium, sodium, potassium, lithium, bismuth, indium, cerium, tellurium, zirconium, silver, titanium and copper, in a mixture, an alloy or as a pure material.

6. The process according to claim 5, which further comprises selecting the metallic particles from the group consisting of a mixture of aluminum and zinc, a mixture of aluminum and magnesium and a mixture of aluminum, zinc and magnesium.

7. The process according to claim 6, which further comprises setting a portion of the aluminum in the corrosion protection layer to be from 1 to 40% by weight, a proportion of the zinc to be from 20 to 90% by weight, and a proportion of the magnesium to be from 0 to 90% by weight, in each case based on a total weight of the corrosion protection layer.

8. The process according to claim 6, wherein the metallic particles in the corrosion protection layer are present in a matrix of oxidic nanoparticles of metals or semimetals.

9. The process according to claim 6, wherein the metallic particles in the corrosion protection layer are present at least one of in a matrix of titanium dioxide or of organic compounds.

10. The process according to claim 1, which further comprises forming the cold-rolled strip with a structured surface, and in that an average surface roughness Ra of a surface of the cold-rolled strip before application of the medium is in a range from 0.9 to 1.5 microns.

11. The process according to claim 1, which further comprises providing the metallic particles with a spherical shape and in that an average diameter of the metallic particles is in a region of an average surface roughness Ra of a surface of the cold-rolled strip.

12. The process according to claim 1, wherein the metallic particles have a flattened, platelet-like shape and in that a diameter of the metallic particles is greater than an average surface roughness Ra of the surface of the cold-rolled strip.

13. The process according to claim 12, wherein the flattened platelet-like metallic particles have a thickness of less than 1 micron and an average diameter in a range from 5 to 20 microns.

14. The process according to claim 1, which further comprises forming a layer thickness of the dried medium on the cold-rolled strip to be essentially constant in sections and is in a range from 1 micron to 10 microns.

15. The process according to claim 1, which further comprises setting the temperature during the drying to be below 300 degrees Celsius.

16. The process according to claim 1, which further comprises setting the temperature during the drying to be below 250 degrees Celsius.

17. The process according to claim 6, which further comprises setting a portion of the aluminum in the corrosion protection layer to be from 5 to 20% by weight, and a proportion of the zinc to be from 50 to 80% by weight, and a proportion of the magnesium to be 0 to 90% by weight, in each case based on a total weight of the corrosion protection layer.

18. The process according to claim 6, which further comprises setting a portion of aluminum in the corrosion protection layer to be from 5 to 20% by weight, and a proportion of zinc to be from 20 to 90% by weight, and a proportion of magnesium to be 50 to 80% by weight, in each case based on a total weight of the corrosion protection layer.

19. The process according to claim 9, which further comprises selecting the organic compounds from the group consisting of polyurethanes, polyesters, epoxy resins, alkyd resins, phenolic resins, melamine resins, acrylates, methacrylates, organic-inorganic compounds, oligosiloxanes, polysiloxanes from hydrolysis, condensation of alkylalkoxysilanes or alkoxysilanes, mixtures thereof, silicones, silicone resins, organically modified silicone resins, purely inorganic compounds, silicates, polyphosphates, aluminosilicates and metal oxides.

20. The process according to claim 10, which further comprises forming the cold-rolled strip with the structured surface by rolling.

21. The process according to claim 1, wherein the metallic particles have a flattened, platelet-like shape and in that a diameter of the metallic particles is 1.5 to 10 times greater than an average surface roughness Ra of a surface of the cold-rolled strip.

22. The process according to claim 12, wherein the flattened platelet-like metallic particles have a thickness of less than 0.5 micron and an average diameter in a range from 10 to 15 microns.

23. The process according to claim 1, which further comprises forming a layer thickness of the dried medium on the cold-rolled strip to be essentially constant in sections and is in a range from 3 microns to 5 microns.

24. A method of using a coated metal strip, which comprises the steps of:
- providing a coil of a cold-rolled strip obtained by cold rolling, cooling and recrystallization annealing;
- unwinding the cold-rolled strip off of the coil;
- applying a medium having metallic particles to the cold-rolled strip for forming a corrosion protection layer resulting in a coated semi-finished strip, the medium being a wet-chemical solution applied by one of spraying, dipping, squirting, flooding or rolling;
- drying the corrosion protection layer on the cold-rolled strip by supplying heat at a temperature being below a recrystallization annealing temperature of the cold-rolled strip after application of the medium and before optionally rolling up; and
- forming one of parts for vehicles, parts for machines, parts for industrial plants, parts for agricultural appliances, parts for building and construction or parts for use in mining, from the cold-rolled strip.

* * * * *